United States Patent [19]

Janex

[11] 3,913,100

[45] Oct. 14, 1975

[54] DEVICE FOR DECODING PULSE-CODED DATA

[75] Inventor: Albert Janex, Cachan, France

[73] Assignee: International Standard Electric Corporation, New York, N.Y.

[22] Filed: Dec. 20, 1973

[21] Appl. No.: 426,528

[30] Foreign Application Priority Data

Feb. 22, 1972 France ............................ 72.45920

[52] U.S. Cl. .......... 343/6.5 LC; 328/119; 329/107; 343/6.8 LC

[51] Int. Cl.$^2$ ....................... G01S 9/56; H03K 9/04

[58] Field of Search ....... 343/5 DP, 6.8 LC, 6.5 LC; 329/107; 328/119

[56] References Cited

UNITED STATES PATENTS 3,721,906 3/1973 Geesen et al. ............ 343/6.8 LC X

*Primary Examiner*—Malcolm F. Hubler
*Attorney, Agent, or Firm*—William T. O'Neil

[57] ABSTRACT

A decoder device for decoding binary codes words each formed by a sequence of $(n-1)$ logic conditions at a clock period $\theta$. The code words are contained within a pair of "frame" pulses. A high clock frequency is used with a unique arrangement of timing circuits minimizes the number of shift register stages required in the decoding circuitry. The circuits allow for pulse time position tolerances of $\pm \Delta\theta$ and a corresponding unity recognition probability band between $\theta + \Delta\theta$ and $\theta - \Delta\theta$.

9 Claims, 1 Drawing Figure

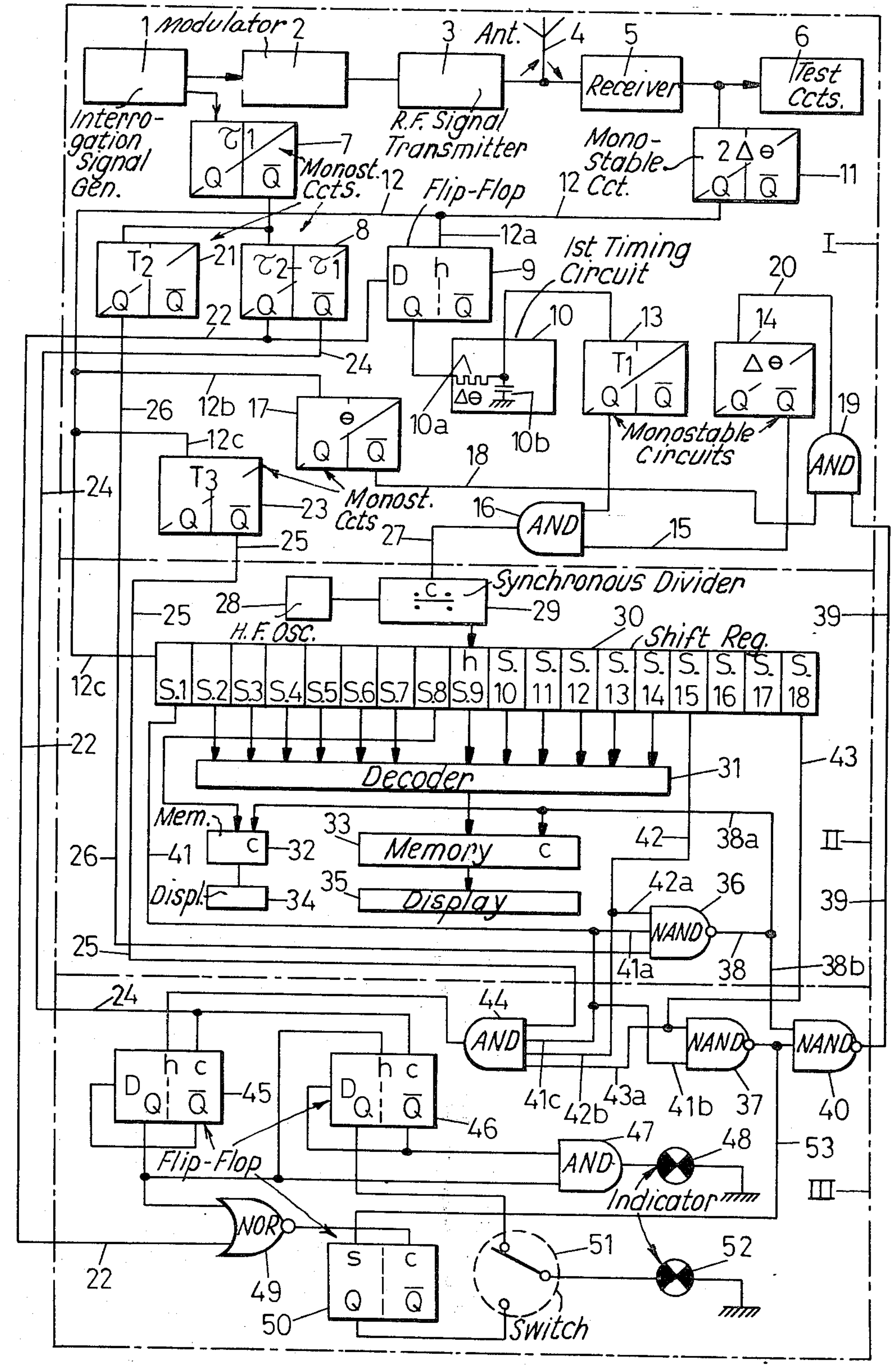
Modulator
Interrogation Signal Gen.
R.F. Signal Transmitter
Ant.
Receiver
Test Ccts.
Monost. Ccts.
Mono-Stable Cct.
Flip-Flop
1st Timing Circuit
Monostable Circuits
Monost. Ccts
AND
Synchronous Divider
H.F. Osc.
Shift Reg.
Decoder
Mem.
Memory
Displ.
Display
NAND
AND
Flip-Flop
Indicator
NOR
Switch
I
II
III

DEVICE FOR DECODING PULSE-CODED DATA

BACKGROUND OF THE INVENTION

1. Field of the Invention

The present invention relates to decoder devices for decoding data or encoded words arranged in the form of combinations of regularly spaced pulses.

2. Description of the Prior Art

Secondary radar systems wherein encoded words or "codes" are transmitted by an airborne transponder in response to encoded interrogations transmitted by a ground station constitute an example of a system in which the present invention is particularly useful.

The state of the coded-reply transponder art is described in the technical literature. Chapter 38 of the text "Radar Handbook" by Merrill Skolnik (McGraw Hill 1970) is useful in providing a background in this art. U.S. Pat. No. 2,741,759 is also of interest in understanding the general class of devices to which the present invention may be applied.

In general, each encoded word includes a sequence of ($n$—1) logic conditions "0" or "1", the 1 being represented by a pulse edge-spaced by time intervals of standard value $\theta$. Those sequences of conditions permit the generation of $2^{(n-1)}$ binary codes, each code including ($n$—1) bits.

In known prior art, replies are decoded by means of a shift register fed by a clock having a period (or step) which is a submultiple ($\theta/g$) of $\theta$ ($g$ being an integer).

Time interval between logic conditions of a code is determined to a predetermined tolerance $\Delta\theta$ with respect to the standard value $\theta$.

Since any word comprising successive logic conditions spaced by an out-of-tolerance time interval must be rejected during the decoding operation, a clock step ($\theta/g$) (g being an integer) must be selected which is at the longest equal to $\Delta\theta$; that is $g \geq (\theta/\Delta\theta)$. In such conditions, taking into account the fact that shift register operation has a quantized character, the probability of the decoder to accepting two successive pulses, which is unity when the time interval is equal to standard value $\theta$, decreases linearly to 0 when the time interval varies from $\theta$ to $\pm(\theta/g)$.

In order to broaden the decoding operation conditions, which may be accepted as far as interval tolerances are concerned, certain rather sophisticated artifices have been adopted in the prior art to permit an operating range wherein recognition probability is equal to 1 for deviations from standard value between 0 and $\pm (h/2)(\theta/g)$, bracketed by two areas wherein recognition probability linearly decreases from 1 to 0 when deviation varies from $(h/2)(\theta/g)$ to $$\left(\frac{h}{2}+1\right)\frac{\theta}{g}$$

and from $-(h/2)(\theta/g)$ to $$-\left(\frac{h}{2}+1\right)\frac{\theta}{g},$$

$h$ being an integer.

In such conditions, the complete deviation area for recognizable deviations is $$\left(h+2\right)\frac{\theta}{g},$$

and there is need for $(h+2)(\theta/g) < 2\,\Delta\theta$, that is $$g \geq \frac{h+2}{2}\,\frac{\theta}{\Delta\theta}.$$

Considering a word with standard time interval of $\theta = 1.45\ \mu s$, with $\Delta\theta = 0.2\ \mu s$, and assuming that $h = 0$, the value of $g$ is 8.

It will be then necessary for decoding a word comprising only two pulses spaced by 1.45 $\mu s$ to utilize an eight-stage shift register with a clock step of 0.18 $\mu s$. As messages utilized in secondary radar system may comprise up to 14 successive conditions with standard spacing of 1.45 $\mu s$ (tolerance remaining the same for any pair of adjacent pulses) it appears that the shaft register must comprise 112 stages.

If it is attempted to improve decoding conditions by taking $h = 3$, the following values are respectively found: $(\theta/g) \leq 80\ ns$, $g = 19$.

Thus, now 19 stages are needed for decoding a word limited to two pulses spaced by 1.45 $\mu s$, and 266 stages are needed for decoding a message comprising 14 successive conditions.

The need to make a fine analysis of the decoded message and to have a good probability of recognizing acceptable pulses, as far as time interval tolerances are concerned, thus requires large shift register capacity.

Moreover, it is to be noted that the quantized operation character of the shift register results in a precise relation between tolerance and clockstep ($\theta/g$), i.e.,:

$$\frac{\theta}{g} = \frac{2\,\Delta\,\theta}{h+2}$$

(with $h = 0, 1, 2, \ldots$)

The manner in which the present invention improves upon the foregoing state of the art will be understood as this description proceeds.

SUMMARY

One of the purposes of the present invention is to provide a decoder device capable of decoding $2(n-1)$ encoded words, arranged in the form of combinations of 0 to ($n$—1) pulses plus an initial (reference) pulse, wherein the register utilized has a number of stages equal to $n$.

The device according to the invention is usable when the word to be decoded is free from any interference signal (noise or jamming). Such a device finds its best application in test apparatus for secondary radar responder systems.

According to this invention, the word decoding operation is performed by means of a shift register fed by a clock having a step equal to a standard time interval $\theta$ between logic conditions of the word to be decoded.

The device according to this invention makes it possible to decode words wherein pulses are located at their standard position with a tolerance of $\pm\Delta\theta$, with that tolerance substantially independent of the clock step $\theta$. The deviation areas on each side of the standard interval $\theta$, wherein the probability of pulse recognition varies from 0 to 1, are reduced and independent of the clock step. The probability of accepting or recognizing time intervals between $\theta - \Delta\theta$ and $\theta + \Delta\theta$ thus is substantially equal to 1.

The decoder device according to this invention is associated with a number of well-known conventional circuit, including high frequency circuits which receive signal modulated by an encoded word, detection circuits for encoded word recognition, and circuits for shaping encoded word pulses.

In the following, only leading edges of reshaped pulses will be considered as operating the decoder device input.

According to a feature of this invention, reshaped pulses trigger a first timing circuit, such as a monostable circuit having a switching duration or time constant $2\ \Delta\theta$. Each so generated pulse, having a width $2\ \Delta\theta$, is applied to the input of a shift register, which may be controlled by a clock having a period $\theta$ and comprising a synchronous divider-by-k receiving pulses, at frequency $(k/\theta)$, from a highly stabilized generator. The leading or initial pulse, which always exists in a word, also triggers a second timing circuit, having a time constant $\Delta\theta$, which controls, at the end of that time $\Delta\theta$, the operation of the divider-by-$k$ and thus of the clock for a time $T_1$; determined by a timing circuit having a time constant $T_1$ ($T_1$ being substantially longer than the duration of the longest word to be decoded).

A pulse, having width $2\ \Delta\theta$, corresponding to the reference pulse enters the first stage of the shift register as soon as divider-by-$k$ is turned on, and is thus in the middle of time interval $2\theta$. It is this divider-by-$k$ turning-on time which serves, as a reference, for processing the following pulses of the word to be decoded.

Each of the successive reshaped pulses triggers, in turn, the first timing circuit, having a time constant $2\ \Delta\theta$, and either enters or is rejected by the shift register at the rate of clock step $\theta$, depending on the time interval from the reference pulse [if inside or outside of $(s\theta \pm \Delta\theta)$]. In that relation, $s$ indicates the pulse rank of the pulse in the word to be decoded $[1 \leq s \leq (n-1)]$.

It may still be that the clock is synchronized on the reference pulse leading edge delayed by $\Delta\theta$, the synchronization being made with a statistic uncertainty equal to $(\theta/2k)$, i.e. half period of the highly stabilized generator.

Thus it appears that areas where the probability of receiving encoded word pulses in the shift register varies from 0 to 1, are limited to two fringes of width $(\theta/2k)$, located on the borders of tolerance time intervals $-\Delta\theta$ to $+\Delta\theta$.

Thus, practically, it is sufficient to select $k$ such as $(\theta/2k) \ll \Delta\theta$.

According to a well-known process, encoded word pulses, after having been accepted, are shifted by one stage, in the shift register, for each clock pulse. According to this invention, when the reference pulse has reached a predetermined stage in the said register, outputs conditions of the following stages represent, in parallel, the conditions 0 or 1 corresponding to a binary word, which is the encoded word to a higher order of certainty, if time interval between each pulse and the reference pulse is within tolerances $\pm\Delta\theta$.

According to known processes, the binary word from register outputs is normally decoded and stored, and the shift register is reset, so as to receive the next word to be decoded.

Replies from secondary radar transponders usually are bracketed by two frame pulses $F_1^o$ and $F_2^o$, which always exist spaced by $[(n+1)\ \theta \pm \Delta\theta]$ enclosing from 0 to $n$ pulses, which may constitute $2^{n-1}$ binary codes with $(n-1)$ bits (they are the normal replies to interrogations) and $m$ special codes, called code X.

It is to be noted that normal replies are different from the encoded word considered up to now, by the addition of an end pulse $F_2^o$ and a condition representing a special code X.

In certain cases, transponders may transmit, after a normal reply, special messages comprising either a pulse, called SPI, spaced from $F_2^o$ by $(m\theta \pm \Delta\theta)$, or $q$ words comprising, at least, two frame pulses $F_1^q$ and $F_2^q$ spaced by $[(n+1)\ \theta \pm \Delta\theta]$, time intervals from $F_2^o$ and $F_1^1$, as well as $F_2^{q-1}$ and $F_1^q$ being $(m\theta \pm \Delta\theta)$. A normal reply followed by a pulse SPI may constitute a position identification code. Followed by $q$ words, a special message or code characterized by the number $(q+1)$ (mayday message, for example) is constituted.

A decoder device having the above mentioned feature can be, with a few adaptations, utilized for decoding special codes.

First it is to be noted that, in the described device, the reference pulse is the first frame pulse $F_1^o$ of a normal reply, and for each time interval $(m\theta \pm \Delta\theta)$ or $[(n+1)\theta \pm \Delta\theta]$, the new reference for acceptance or rejection of a pulse which follows the normal code is not the pulse $F_1^o$ which terms the divider after a time $\theta$, but pulse $F_2^o$, SPI or $F_1^1$, $F_1^2$, etc. . . . up to $F_1^q$.

The timing circuit, having time constant $T_1$, is slightly longer than the longest special code length.

According to a feature of the decoder device, arranged according to this invention, the shift register comprises $(n+2+m)$ stages, the outputs of the 2nd and 3rd. . . . $(x-1)$th, $(x+1)$th . . . $(n+1)$th stages being connected to inputs of a first decoder. A specific output of the $x$th stage is connected to the input of a second decoder alloted to recognition of special code X.

A first three-input coincidence circuit, having one inhibition input, which may be on, only for time $T_2$, slightly long than $[(n+1)\ \theta + 2\ \Delta\theta]$, and determined by a timing circuit having a time constant $T_2$, is turned on when pulses $F_1^o$ and $F_2^o$ respectively enter the $(n+2)$th and 1st stages of the shift register. The on-condition of the said first coincidence circuit causes the binary word delivered from the shift register output, after decoding, at the coincidence time, to be stored.

A second four-input coincidence circuit, having one inhibition input, which may be turned on only at the end of a time $T_3$, slightly longer than $[(n+1+m)\theta + 2\ \Delta\theta]$, and determined by a timing circuit having a time constant $T_3$, is actually turned on after time $T_3$ when $F_2^o$, $F_1^1$ and $F_2^1$ respectively enter the $(n+2+m)$th, $(n+2)$th and 1st shift register stages. Then, it is turned on when $F_2^1$, $F_1^2$ and $F_2^2$ respectively enter the same stages and so on up to $F_2^{q-1}$, $F_1^q$ and $F_2^q$. A counter of capacity $(q+1)$ counts the number of on-conditions for the second coincidence circuit and this number characterizes a special code.

Another feature of the decoder device presented permits successive synchronization of the clock, at step $\theta$, on leading edges of pulses $F_2^o$, SPI or $F_1^1$, $F_2^1$ . . . $F_2^{q-1}$, $F_1^q$ delayed by $\Delta\theta$. According to this feature, the leading edge of each pulse of width $2\ \Delta\theta$, generated by the timing circuit having a time constant $2\ \Delta\theta$, controls the triggering of a timing circuit having a time constant $\theta$. Simultaneously, the same leading edge, if a pulse $F_2^o$, SPI, $F_1^1$, $F_2^1$ . . . $F_1^q$ has been recognized by the shift register, causes, for a time $\theta$, by means of an assembly of logic gates, the generation of a signal which allows the third coincidence circuit to be turned on. This actually occurs at the end of the time $\theta$ defined by the timing circuit having the constant time $\theta$. The turning on of the third coincidence circuit triggers a second timing circuit having a time constant $\Delta\theta$ which controls, for the time $\Delta\theta$, the operation of divider-by-$k$. At the end of time $\Delta\theta$, the clock, at step $\theta$, is synchronized by one of the pulses $$F_2^o, SPI, F_1^1, F_2^1 \ldots F_2^{q-1}$$

and $F_1^q$ to $(\theta/2k)$.

Thus, it appears in the new synchronization process, the timing circuit, having time constant $\theta$, temporarily replaces the clock, at step $\theta$, and that the second timing circuit, having time constant $\Delta\theta$, has the same function with respect to pulses $F_2^o$ to $F_1^q$ as the first timing circuit having the same time constant $\Delta\theta$ with respect to the first frame pulse $F_1^o$.

When the device according to this invention is used in a secondary radar responder test apparatus, one must ascertain that pulse $F_1^o$ appear, at the device input, after a certain time lying between $\tau_1$ and $\tau_2$ following the transmission from the interrogator of reference pulse, called $P_3$.

According to another feature of this invention, two cascaded timing circuits, having respectively time constants $\tau_1$ and $(\tau_2-\tau_1)$, controlled by pulse $P_3$, allow the clock, at step $\theta$, to be switched on via the first timing circuit having time constant 2 $\theta$ and the second timing circuit having time constant $\Delta\theta$, only within a time interval from $\tau_1$ to $\tau_2$, after the transmission of $P_3$.

Other features of this invention will appear more clearly from the following description of an embodiment, the said description being made in conjunction with the accompanying drawing. The device is particularly useful for testing for correct transponder encoder and transmitting functions.

BRIEF DESCRIPTION OF THE DRAWINGS

A single FIGURE presents a functional and logical diagram of the circuits of an embodiment of the invention, with particular reference to a decoder for coded transponder replies.

DESCRIPTION OF THE PREFERRED EMBODIMENT

In a secondary radar system, the ground station interrogator transmits trains of at least two pulses, the time interval between extreme pulses ($P_1$ and $P_3$) characterizing an interrogation mode. In known systems, if airborne equipment is capable of recognizing an interrogation mode, it transmits a first pulse $F_1$ at time $\tau_o \pm \Delta\tau_o + t_1$ after the transmission of pulse $P_3$ by the interrogator. That pulse $F_1$ will be received in the ground station, at time $\tau_o \pm \Delta\tau_o + 2t_1$.

$\tau_o$ corresponds to internal transponder delay, $\pm \Delta\tau_o$ corresponds to internal delay tolerance, and $2t_1$ measures round trip transmission time of RS signals comprising interrogation and encoded reply.

In most airborne equipments, $\tau_o = 3$ $\mu s$ and $\Delta\tau_o = 0.5$ $\mu s$.

Following the first frame pulse $F_1$ and at regular intervals $\theta$, the transponder transmits $n$ conditions 1 or 0 corresponding to the presence or absence of a pulse leading edge. The sequence of $(n-1)$ of those conditions determines an encoded reply word or "code" out of the $2^{n-1}$ possible codes. The $n$th condition is available to provide, for example, a specific feature information X, which may be of interest at the ground station.

At time $\theta$, after having generated the $n$th condition of its reply, the transponder delivers a second frame pulse $F_2$.

The time interval between leading edges of $F_1$ and $F_2$ is equal to $(n+1)$ $\theta$, and for that time interval, a tolerance equal to $\pm \Delta\theta$. $\pm \Delta\theta$ also determines the tolerance on the time interval between $F_1$ and each of the code pulses.

In known equipments, $n=13$, $\theta = 1.45$ $\mu s$ and $\Delta\theta = 0.2$ $\mu s$. The interval $(F_2 - F_1)$ then is of the order of $(20.3 \pm 0.2)$ $\mu s$.

The number of possible codes is equal to $2^{12}$ or 4096. Besides those $2^{n-1}$ replies normal codes and information X, the transponder may provide, at the ground operator's request, a specific code, called position identification, either, in the form of a pulse SPI delivered at time $m\theta \pm \Delta\theta$ following pulse $F_2$ (case of interrogation modes called 2, 3 and c), or, in the form of a repetition of the first reply word, pulse $F_1$ of the repetition occurring at time $(m\theta \pm \Delta\theta)$ after pulse $F_2$ of the first word (case of interrogation mode called 1).

Finally, in mayday cases, the interrogated transponder may reply to an interrogation with a third reply word such as it has been hereabove defined, followed at time intervals $(m\theta \pm \Delta\theta)$ by $q$ "empty" words (that is limited to only frame pulses $F_1$ and $F_2$ spaced by $(n+1)$ $\theta \pm \Delta\theta$). The length of a specific message or mayday code is thus equal to:

$$[(n+1)(q+1) + mq]\ \theta \pm (2q+1)\Delta\theta.$$

Practically, $n = 3$ and $q = 3$ with $m = 13$; $\Delta\theta = 0.2$ $\mu s$; $\theta = 1.45$ $\mu s$.

The normal length of a mayday message is thus 65 $\theta = 94.25$ $\mu s$ with an uncertainty of $\pm 7$ $\Delta\theta = \pm 1.4$ $\mu s$.

Either normal or specific codes are transmitted in sequence at time intervals $t_r$ of about 2.5 ms (repetition frequency $(1/t_r)$ is about 400 Hz).

From the above it appears that the device, shown in FIG. 1, must comprise a number of timing circuit which determine the time durations to be taken into account for allowing the decoder to accept or reject encoded pulses or words. Those circuits are constituted by monostable circuits having free-running periods or time constants equal to:

$$\tau_1 = \tau_o - \Delta\tau_o + 2t_1\ (2.5\ \mu s + 2t_1)$$

$\tau_2 - \tau_1 = 2\ \Delta\tau_o = 1$ $\mu s$ $\theta = 1.45$ $\mu s$ $\Delta\theta = 0.2$ $\mu s$ $2\ \Delta\ \theta = 0.4$ $\mu s$ $T_1$ is slightly longer than $[(n+1)(q+1) + mq]\ \theta + (2q+1)\ \Delta\theta$, (that is, in this case, slightly longer than 96 $\mu s$).

$T_2$ is slightly longer than $(n+1)\ \theta + 2\ \Delta\theta + 2\ \Delta\tau_o$, (that is, in this case, slightly longer than 21.7 $\mu s$), and $T_3$ is slightly longer than $[(n+1) + m]\ \theta + 2\ \Delta\theta$, (that is, in this case, slightly longer than 25 $\mu s$).

Referring now to FIG. 1, several types of logic circuits such as flip-flops, monostable circuits and gates will be recognized.

As a rule, flip-flops turn their condition when a leading pulse edge is applied to their pulse input $h$ (switching from 0 to 1).

In the diagram, each flip-flop also has a priority input C and, possibly, another priority input S. When level 0 is applied to input C, output Q of the flip-flop is turned to condition 0. On the contrary, level 0 applied to input S causes output Q to turn to condition 1.

Output Q of each monostable circuit in the drawing is turned from condition 0 to condition 1 by applying to its input a leading edge, and turns back to initial 0, after a time $t_o$ ($t_o$=self-timing period or time constant). Such a time $t_o$ is well determined after that the said leading edge has been applied.

In the drawing, a monostable circuit called "retriggerable circuit" is also used. In such a monostable circuit, if a second leading edge is applied to the input, at a time t after the first leading edge, the output holds condition 1 during a time $t_o + t$.

For language convenience, logic gates in the FIG. 1, will be considered as "off" when their output is in condition 0, and "on" in the reverse case.

In the description, $F_1{}^o$ and $F_2{}^o$ will indicate frame pulses for a normal code, when they enter the device and $F_1{}^1$, $F_2{}^1$ . . . $F_1{}^q$, $F_2{}^q$ will indicate frame pulses of following words, in case of decoding a specific code.

The diagram comprises three blocks I, II and III. Block I basically comprises

- circuits for encoding and transmitting interrogations according to several predetermined modes,
- circuits for receiving, detection and reshaping reply pulses from a transponder replying to recognized interrogations, and
- an assembly of monostable circuits which generate the various timing durations, as hereabove mentioned, Block II basically comprises circuits for recognizing and decoding normal codes. Block III basically comprises circuits for recognizing and decoding specific codes.

Description of Block I:

Box 1 is an interrogation signal generator which delivers the signal needed for triggering the responder on one or several modes.

Box 2 is a modulator which converts the interrogation signal delivered from 1 into RS frequency.

Box 3 is the RF signal transmitter for transmitting signals from 2.

An antenna 4, provided with a circulator, radiates toward the transponder, not shown, the signals from 3, and receives from the transponder encoded replies carried by the RS signal.

A receiver 5 delivers from its output the detected signal in the form of a train of reshaped pulses which reproduce the reply, as encoded in the transponder.

An assembly of test circuits 6 permits testing transponder characteristics particularly as far as radiated power and RS frequency are concerned.

In the transponder test equipment, antenna 4 may be replaced by a coaxial cable provided with a directional coupler which connects the output of 3 to the transponder under test. Whatever the adopted connection mode, round trip time for messages at RS frequency, is well defined and is equal to $2t_1$. Here it will be assumed that $2t_1 = 0.2\ \mu s$.

One output of 1, from which only pulse $P_3$ of interrogations is delivered, is connected to an input of a monostable 7 having a free-running duration of $\tau_1 = \tau_o - \Delta\tau_o + 2t_1$ (that is here 2.7 $\mu s$).

Output $\bar{Q}$ of 7 is connected to an input of monostable circuit 8 having free-running (self-timing) duration of $2\Delta\tau_o = \tau_2 - \tau_1$ (that is here 1 $\mu s$).

Output Q of 8 is connected to data input D of a flip-flop 9. Output Q of 9 is connected to one end of a resistor 10a having its other end connected to one plate of a capacitor 10*b* having its other plate grounded; 10*a* and 10*b* forming a delay circuit 10 having a delay time equal to $\Delta\theta$ (i.e. 0.2 $\mu s$). Box 10 represents the first timing circuit having a time constant $\Delta\theta$, as mentioned hereinbefore.

The output of receiver 5 is connected to an input of monostable circuit 11 having a free-running duration of $2\ \Delta\theta$ (i.e. 0.4 $\mu s$).

Output Q of 11 is connected to pulse input h of flip-flop 9, via a connection 12 and branch 12*a* thereof.

Line 12 also connects block I to block II.

A connection is established between common junction point of 10*a* and 10*b*, and the input of monostable 13 having a free-running duration which is slightly longer than $[(n+1)\ (q+1) + mq]\ \theta \pm (2q+1)\ \Delta\theta$, i.e., longer than 96 $\mu s$. $T_1$ is for example selected equal to 100 $\mu s$.

Output Q of 13 is connected to one of a two-input AND gate 16 whose other input is connected, via line 15 to output $\bar{Q}$ of a monostable circuit 14 having a free-running duration $\Delta\theta$.

Gate 16 usually is off and is turned on only if outputs Q of 13 and $\bar{Q}$ of 14 are simultaneously in condition 1.

Line 27 from output of AND gate 16 enters block II, operation of which is allowed only if gate 16 is on.

A branch 12b of line 12 is connected to input of a retriggerable monostable circuit 17, having a free-running duration equal to $\theta$. Output $\bar{Q}$ of 17 is connected, via line 18, to one of a two-input AND gate 19 having its other input connected, via line 39, into block III. The output of 19 is connected, via line 20, to input of monostable circuit 14. Circuit 19 represents the third coincidence circuit mentioned hereinbefore.

Usually, gate 19 is off and output $\bar{Q}$ of 14 is at level 1. In such conditions, the on or off condition of gate 16 depends only on condition 1 or 0 of output Q of 13.

It will be seen that gate 19 and monostable circuit 14 are not involved in the decoding operation of specific mayday or position identification codes.

A line 22 is established from output Q of 8 to block III.

Similarly, line 24 is established from output $\bar{Q}$ of 8 to block III.

The input of monostable circuit 21 is connected from output $\bar{Q}$ of 7 while output Q of 21 is connected, via line 26, to block II.

The free-running duration $T_2$ of 21 is slightly longer than $[(n+1)\ \theta + 2\Delta\theta + 2\Delta\ \tau_o]$, that is, in the described embodiment longer than 21.7 $\mu s$. For example, $T_2$ is selected equal to 22 $\mu s$.

Monostable circuit 21 prevents decoding (in block II) of pulses which would be outside of interval $F_1{}^o - F_2{}^o$ defined by the frame pulses of a normal word.

The input of monostable circuit 23 is connected, via line 12-12C, from output Q of 11. Output $\bar{Q}$ of 23 is connected, via line 25, to circuits of block III. The free-running duration $T_3$ of 23 is likely longer than $[(n+1)+m]\theta+2\Delta\theta$, that is here longer than 25 $\mu s$. For example, $T_3$ is selected equal to 26 $\mu s$. Monostable circuit 23 prevents counting, in block III, of the first interval $F_1{}^o - F_1{}^1$ recognized in block II.

Operation of Block I:

When an interrogation pulse $P_3$ is generated by 1, after a time duration normally between 2.7 $\mu s$ and 3.7 $\mu s$, the frame pulse $F_1{}^o$ of the reply transmitted from the transponder is delivered from output of 5 to switch 11, whose output Q is the turned to condition 1 and is also delivered as input h of flip-flop 9.

If the change condition of input h of 9 occurs within a time comprised between 2.7 $\mu s$ and 3.7 $\mu s$ after transmission of $P_3$, flip-flop 9 is switched and output Q of 9 has the value 1, corresponding to the condition of its input D. Capacitor 10*b* of circuit 10 is charged in a time $\Delta\theta = 0.2$ $\mu s$. At the end of that time, 13 is switched and output Q of 13 goes to condition 1 for a time $T_1$ equal to 100 $\mu s$. AND gate 16 is turned on and via line 27, and block II is allowed, provided that certain conditions are met, to decode the reply word following the frame pulse $F_1{}^o$.

If $F_1{}^o$ is delivered from output of 5 outside the aforesaid limits (2.7 $\mu s$ to 3.7 $\mu s$), after the generation of $P_3$ by 1, it is not recognized as the first frame pulse of a possible reply since there is no condition change in 9 and, therefore, gate 16 remains off.

Considering timing circuits 10, 11 and 13, it is now understood that the occurrence of the leading edge of the first frame pulse $F_1{}^o$ constitutes the reference for measuring time elapsed from the first frame pulse $F_1{}^o$ to a pulse of rank s in a normal reply word. If, as it will further appear, the time is outside interval $s\theta \pm \Delta\theta$, pulse of rank *s* is not considered in the decoder of block II.

The same is obviously true for the frame pulse $F_2{}^o$ at the end of a word, i.e., it will not be considered if it appears at a time outside of interval $(n+1)\theta \pm \Delta\theta$.

Description of block II:

High frequency oscillator 28 delivers pulses of period $(\theta/k)$ which are substantially shorter than $\Delta\theta$.

If, for example, $$\frac{\theta}{\Delta\theta} = \frac{1.45}{0.2} = 7,$$

*k* is selected equal to 32.

Pulses of period $(\theta/k)$ are sent to a synchronous divider-by-k 29.

All flip-flops in a chain which constitutes divider 29, are provided with a priority reset input C and divider 29 does not operate as long as input C is maintained in condition 0 by line 27. The output of 29 is connected to clock input h of shift register 30, the latter including $(n+2+m)$ stages (that is, here 18) referenced from $S_1$ to $S_{18}$.

The twelve outputs of stages $S_2 - S_7$ and $S_9 - S_{14}$ are associated with decoder 31 wherein, during operation of register 30, binary numbers, each having 12 bits determined by either condition 1 or 0 of outputs $S_2 - S_7$ and $S_9 - S_{14}$, are written in decimal code, at the rate $\theta$.

The output of 31 is connected to the input of memory 33 which is provided with a writing enable input C. When a level 0 is applied to C, memory 33 stores the number which is, at that time, is registered in 31, that number also appearing on a display 35.

In a same manner the output of stage $S_8$ of register 30 is connected to the input of memory 32, provided with writing enable input C. When level 0 is applied to C, memory 32 stores the binary data (data X), registered at that time on output of $S_8$, such data also appearing on a display 34. A three-input NAND gate 36 has its first input connected, via line 26, from output Q of monostable circuit 21 (block I); its second input connected, via line 41 and its branch 41*a*, from the output of stage $S_1$ of register 30; and its third input connected, via line 42 and its branch 42*a*, from output of stage $S_{15}$ of 30. The first coincidence circuit NAND gate 36, as hereinbefore indicated, is substantially always open and is only closed when the three inputs of NAND gate 36 are simultaneously at level 1.

The output of 36 is connected, via line 38 and its branch 38*a*, to writing enable inputs C of memories 32 and 33. A branch 38b of 38 enters block III.

Operation of block II in association with block I:

When pulse $F_1{}^o$ occurs from the output of 5, within the time limits determined by monostable circuits 7 and 8, it turns the condition of outputs Q of 11 and of 9, then, after a time $\Delta\theta$ - via 10 also the condition Q of 13. Gate 16 is turned on, the output of divider 29 is turned to level 1 and the first clock pulse, at rate $\theta$ (i.e. 1.45 $\mu s$), controls register 30. That first clock pulse, at rate $\theta$, is generated after a time comprised between 0 and $(\theta/k)$, after 16 has turned on.

Via line 12, level 1 from output Q of 11 has been applied to the input of register 30, at a time preceeding the first clock pulse by $\Delta\theta$. When that first clock pulse occurs, level 1, corresponding to the leading edge of pulse $F_1{}^o$, turns the output of stage $S_1$ of 30 to 1.

At each pulse of rank s of a normal reply word, occurring within a time period comprised between $(s\theta - \Delta\theta)$ and $(s\theta + \Delta\theta)$ after $F_1{}^o$, 11 is switched on during a time $2\Delta\theta$ (i.e.: 0.4 $\mu s$) and level 1, corresponding to the leading edge of that pulse of rank *s*, is applied to input of 30. After a time, at most $2\Delta\theta$, the (s+1)th clock pulse, at a rate $\theta$, which controls 30, causes the output of stage $S_1$ of 30 to be turned to condition 1. At that time, pulse $F_1{}^o$, which has already been shifted by *s* stages in 30, turns the output of the $(s+1)$th stage.

Thus all the pulses of a normal word are shifted, in register 30, from left to right, at rate $\theta$.

Such a shift is continued up to the occurrence (from 5) at the end of a normal reply word, of the second fram pulse $F_2{}^o$. If it occurs within the correct time limits [between $(n+1)\theta - \Delta\theta$ and $(n+1)\theta + \Delta\theta$, i.e. between 20.1 $\mu s$ to 20.5 $\mu s$]; it enters, in turn, register 30 under the control of the next clock pulse at rate $\theta$.

At that time, the condition of register 30 is as follows:

output of stage $S_{15}$, containing pulse $F_1{}^o$, is at level 1;

outputs of stages $S_2 - S_7$ and $S_9 - S_{14}$ correspond to a binary coded word having 12 bits, which reproduces the normal reply if each pulse in that reply is correctly spaced from $F_1{}^o$ by $s\theta \pm \Delta\theta$:

output of $S_8$ delivers data X;

output of $S_1$, containing pulse $F_2{}^o$, is in condition 1.

As soon as $F_2{}^o$ has entered, a decimal coded number is delivered from the output of decoder 31, such a number corresponding to the binary coded reply appearing on the outputs of stages $S_2 - S_7$ and $S_9 - S_{14}$ of register 30.

As soon as $F_1{}^o$ and $F_2{}^o$ have respectively entered stages $S_{15}$ and $S_1$, the three inputs of NAND gate 36 are all at level 1. Gate 36 is off, which means that it has recognized a reply which may be accepted as far as the time interval from $F_1^0$ to $F_2^0$ is concerned.

Writing enable input C of memories 32 and 33 are in condition 0. The word, decoded in 31, is stored in memory 33 while data X enters membory 32. Displays 35 and 34 respectively display the normal reply code number and data X, gathered "on the run" by memories 33 and 32.

It should noted that, if the time interval from $F_1^0$ to $F_2^0$ is out of limits, the reply word is not displayed since gate 36 is not off and, during time $T_1$ (i.e.: 100 $\mu s$), clock pulses, at rate $\theta$, shift rightwards the conditions registered on outputs of register 30 which is progressively emptied. At the end of time $T_1$, all the circuits, in blocks I and II, are reset to their initial conditions and are ready to process the next normal reply. If the time interval from $F_1^0$ to any pulse of the processed word is not within the limits $s\theta \pm \Delta\theta$, the decoded word, displayed in 35, is different of the coded word from the transponder. That fact is of significance in when the device is employed for evaluating the operation of the transponder encoder. Indeed, it is easy to compare the displayed replics in 34 and 35 with those encoded by the transponder.

Description of block III:

In block III, a two-input NAND gate 37 has one of its inputs connected from the output of stage $S_1$ of register 30, via line 41 and its branch 41b, and the other input connected from the output of stage $S_{18}$ of register 30 (block II), via line 43.

The output of 37 is connected to one input of a two-input NAND gate 40.

Via a branch 38b of line 38, the other input of 40 is connected from the output of NAND gate 36 (block II).

The output of 40 is connected, via line 39, to one input of the two-input AND gate 19 of block I.

Gates 37 and 40 together constitute the logic gates aforementioned,

Gate 37 is almost always on and is turned off only in when its two inputs are at level 1. Accordingly, 40 is the most often off and is turned on only when one of the two gates 36 or 37 is in the off-condition.

AND gate 19, in block I, thus can be in the on condition only when one of the two gates 36 or 37 is off and output Q of 17 (block I) is at level 1.

It is to be noted that 36 is turned on after recognition of a normal code, since the third input of 36 is reset to level 0 at the end of a time $T_2$ slightly longer than $[(n+1)\ \theta + 2\Delta\theta]$. As a result, for processing specific codes, only gate 37 is involved.

Considering in advance what will be further described, the arrangement of gates 36 (block II), 37-40(block III) and 19 (block I) makes it possible to substitute, in certain cases, the time reference provided from monostable circuit 17 for the reference time resulting from occurrence of a pulse $F_1^0$ from output of 5 (block I).

When 36 is turned on after time $T_2$, it presents words bounded by $F_1^1$ and $F_2^1$, $F_1^2$ and $F_2^2$ . . . , etc., following a normal code written into memories 33 and 32.

A four-input AND gate 44 has its four inputs connected as follows:

The first input is connected, via branch 41$c$ of line 41, from the output of stage $S_1$ of register 30.

The second input is connected, via line 42 and its branch 42$b$, from output of stage $S_{15}$.

The third input is connected, via branch 43$a$ of line 43, from the output of stage $S_{18}$.

Finally, the fourth input, which is an inhibition input, is connected, via line 25, from output of monostable circuit 23 (block I).

The output of 44 is connected to an input of flip-flop 45 which, coupled to flip-flop 46, constitutes an asynchronous counter having a capacity ($q$+1), (i.e. 4).

Outputs Q of 45 and $\bar{Q}$ of 46 are respectively connected to the two inputs of AND gate 47. The output of 47 is connected to one of the terminals of a luminous indicator 48 having its other terminal connected ground (level 0). Luminous indicator 48 is operative when the output of 47 is at level 1. Indicator 48 is used in decoding and recognition of mayday signals. Indicator 48 has a time constant long enough to make it operate as an integrator of successive conditions 1 from output of 47.

Output Q of 45 is connected to one input of a two-input NOR gate 49 having its other input connected, via line 22, from output Q of monostable circuit 8 (block I). The output of 49 is connected to reset input C of flip-flop 50. The input S for setting 50 to 1 is connected, via line 53, from the output of gate 37.

The output Q of 50 is connected to one of the two contacts of a two-position switch 51. The other contact of 51 is connected from output Q of 46.

The prolonged presence of level 1 applied to the upper contact enables luminous indicator 52 to decode specific position identification messages for interrogation mode 1. The prolonged presence of level 1 on the lower contact makes it possible to decode specific position identification messages via pulse SPI for the other interrogation modes.

Indicator 52 has a time constant long enough to allow it to operate as an integrator indicating prolonged conditions 1 of outputs Q of 46 and 50, but it does not recognize short duration condition changes which occur on the same output during specific mayday codes processing.

Operation of block III associated with blocks I and II:

Initially, after the generation of interrogation pulse $P_3$ in 1 (block I), monostable circuit 7 is on for a time $\tau_1$, monostable circuit 8 is, in turn, turned on, with its output $\bar{Q}$ turned to level 0, such a level being transmitted, via line 24, to reset inputs C of flip-flops 45 and 46, causing the outputs Q to be turned to level 0. Similarly, output Q of 8 is turned to level 1, such a level being, via line 22, applied to one input of the two-input NOR gate 49, which is turned off, which turns output Q of 50 to 0 for the time period $\tau_2 - \tau_1$. Gates 36 and 37 are on. Gates 19, 40 44 and 47 are off.

The process of shifting reply pulses through register 30 is first effected as hereabove mentioned.

When pulses $F_1^0$ and $F_2^0$ have respectively reached stages $S_{15}$ and $S_1$, gate 36 is turned off while gate 40 is turned on. In turn, gate 19 is turned on as soon as monostable circuit 17 (which has been turned on when pulse $F_2^0$ is applied to input register 30) has been reset after a time $\theta$. In that case, monostable circuit 14 is turned on for a time $\Delta\theta$, gate 16 is turned off and divider 29 is inoperative up to the reset of 14. The clock operating at rate $\theta$ and consisting of elements 28 and 29, is again operated and is thus synchronized from pulse $F_2^0$, but no longer from pulse $F_1^0$.

It will be noted that, with this new synchronization, monostable 14 operates as the delay circuit 10 used in initial synchronization on $F_1{}^o$.

Accordingly, the circuit is then prepared for decoding specific position identification or mayday messages, if any.

For the three possible specific messages, pulse SPI (or pulse $F'_1$ of another word bounded by pulses $F'_1$ and $F'_2$) enters stage $S_1$ of register 30 at a time between $(m\theta - \Delta\theta)$ and $m\theta + \Delta\theta)$, (i.e. 4.15 $\mu s$ and 4.55 $\mu s$), following pulse $F_2{}^o$.

At that time the outputs of stages $S_1$and $S_{18}$ of 30 are at level 1 since $F_1{}^o$ has reached $S_{18}$. Gate 37 is turned off, gate 40 is turned on as is gate 19, if monostable circuit 17 has been reset. The new synchronization of the clock (consisting of 28 and 29) from pulse SPI or $F'_1$, is then effected as hereabove described.

When switch 51 is in the down position all illustrated, corresponding to the setting for recognition of a code SPI, luminous indicator 52 is operative due to the switching of flip-flop 50 controlled by the off-condition of gate 37.

If the decoded message is a specific code with position identification pulse SPI, output Q of 50 remains in condition 1 up to the occurrence, in 5 (block I), of the pulse $F_1{}^o$ of the next word, i.e. for about a time $t_r$ pf 2.5 ms for example, then is reset for about 25 $\mu s$, and so on. Luminous indicator 52 integrates those prolonged conditions 1 as is illuminated.

If the pulse entering stage $S_1$ of register 30 is the pulse $F_1{}^1$ of the second word of the specific code, different from code SPI, there is then a shift of pulses in register 30, at rate $\theta$, then, up a certain time, pulses $F_2{}^o$, $F_1{}^1$ and $F_2{}^1$ respectively enter stages $S_{18}$, $S_{15}$ and $S_1$ of register 30.

Accordingly, gate 37 is off, which permits a new synchronization of the clock, at rate $\theta$, on $F_2{}^1$ according to the already mentioned process. At the same time, gate 44 is turned on, which switches 45 and 46 causing their outputs Q to be turned to condition 1.

If the recognized specific code is a position identification code of mode 1, output Q of 46 remains in condition 1 up to the occurrence, in 5 (block I), of the pulse $F_1{}^o$ of the next word, i.e. for about a time $t_r$ of 2.5 ms, then is reset for about 50 $\mu s$, and so on. Switch 51 then being in the up position, luminous indicator 52 integrates those prolonged conditions 1 and is illuminated.

In the case of mayday codes, pulses $F_1{}^2$, $F_2{}^2$, $F_1{}^3$ and $F_2{}^3$ successively enter stage $S_1$ of register 30. Each time a pulse enters stage $S_1$, gate 37 is turned off while 19 is turned on, and a new synchronization is produced as already described.

Gate 44 is turned off a second time when pulses $F_2{}^1$, $F_1{}^1$ and $F_2{}^2$ respectively enter stage $S_{18}$, $S_{15}$ and $S_1$ of register 30.

Gate 44 is turned on a third time when pulses $F_2{}^2$, $F_1{}^3$ and $F_2{}^2$ respectively enter the same stages.

Each time gate 44 is on, flip-flop 45 has its condition turned. Flip-flop 46 has its condition turned every other time. On the third oncondition of 44, gate 47 is, in turn, turned on and luminous indicator 48 is operative. The output of 47 remains in condition 1 up to the occurrence, in 5 (block I), of the pulse $F_1{}^o$ of the next mayday code, i.e. for a time slightly shorter than $t_r$ (2.5 ms), then is reset for about 100 $\mu s$, and so on. Luminous indicator 48 integrates those prolonged conditions 1 and is illuminated.

During mayday code decoding, the outputs Q of flip-flops 46 and 50, which control the operation of luminous indicator 52, may have their conditions turned.

Thus, output Q of 46 is turned to level 1 for a time equal to $2(n+2+m)$ — i.e. about 50 $\mu s$ — for each mayday code.

That time duration is too short to enable luminous indicator 52 to light when switch 51 is in the up position.

Similarly, considering flip-flop 50, during each off-condition of gate 37, input S of 50 is turned to level 0 for a time equal to $\theta$. Output Q of 50 is turned to condition 1 and remains in that condition for a time $(n+2)\theta$, i.e. up to the off-condition of gate 49, when output Q of 45 is turned to condition 1, under the control of gate 44. The same process is produced twice during mayday code decoding operation. Output Q of 50 is turned to level 1 for a time equal to $2(n+2)\theta$, i.e. for about 40 $\mu s$ for each mayday code.

That duration is too short to enable luminous indicator 52 to light when switch 51 is down.

While the principles of the present invention have hereabove been described, in relation with a specific embodiment, it will clearly understood that the said description has only been made by way of example and is not intended to limit the scope of this invention.

What is claimed is:

1. A device for decoding pulse sequences of $(n-1)$ logic conditions each 0 or 1 spaced by one clock period $\theta$, thereby determining $2^{n-1}$ normal codes, in which said sequence is marked by an initial pulse $F_1{}^o$, and which is arranged to recognize a pulse delayed $S\theta \pm \Delta\theta$ from said $F_1{}^o$ pulse, where $\Delta\theta$ is a time displacement tolerance, comprising the combination of:

a first timing circuit having a time constant $2\Delta\theta$ responsive to said sequence to be triggered by each pulse thereof including, initially, said $F_1{}^o$ pulse;

a shift register having at least n stages, the input of which is responsive to the $2\Delta\theta$ width pulse output of said first timing circuit;

a clock for generating timing pulses having a period $\theta$ connected to advance said shift register one stage each $\theta$ period, said clock including a pulse generator operating at a frequency $(k/\theta)$ and a divider-by-$k$ circuit responsive to said pulse generator, said divider having an enable input and said K being an integer much greater than $(1/2\Delta)$;

a second timing circuit having a time constant $\Delta\theta$, responsive to the output of said first timing circuit;

a third timing circuit having a time constant T, responsive to the output of said second timing circuit, said third timing circuit being connected to said divider enable input to synchronize said clock for time T, from pulse $F_1{}^o$ delayed by $\Delta\theta$, said T, being a time substantially longer than the longest of said sequence anticipated;

and a decoder coupled to $n-1$ adjacent shift register outputs in parallel, at time $(n+1)\theta$ after said $F_1{}^o$ pulse, conditions 0 and 1 along said register outputs representing said word to be decoded.

2. A decoder device according to claim 1, for processing encoded words which comprise, in addition to the $(n-1)$ logic conditions determining $2^{n-1}$ normal codes and the pulse $F_1{}^o$, and nth logic condition corresponding to a specific code X and an end pulse $F_2{}^o$, the time interval $(n+1)\theta$ from $F_1^o$ to $F_2^o$ being determined with tolerance $\pm\Delta\theta$, the said device including; (n+2) stages in said shift register;

a first three-input coincidence circuit which, for a time $T_2$ following the occurrence of $F_1^o$, is connected to produce a signal when simultaneously $F_1^o$ and $F_2^o$ enter the $(n+2)$th and 1st stages of said shift register whose outputs are connected to two inputs of the first coincidence circuit, $T_2$, determined by timing circuit connected to the third input of the said first coincidence circuit, being slightly longer than $(n+1)\theta + 2\Delta\theta$;

a first decoder connected from outputs of ranks 2, 3, . . . $(x-1)$, $(x+1)$, . . . , $(n+1$ of the shift register for decoding normal codes and a second decoder connected from output of rank $x$ for decoding the specific code X as well as a first memory and a second memory wherein outputs of the first decoder and the second decoder are respectively stored under the control of a signal delivered from the first coincidence circuit, and in which said T, is defined as substantially longer than $(N+1)\theta + 2\Delta\theta$.

3. A decoder device according to the claim 2, for processing specific codes including, after a word made of n logic conditions within a frame determined by pulses $F_1^o$ and $F_2^o$, from one to q words framed by pulse pairs $F_1^1$ and $F_2^1$, $F_1^2$ and $F_2^2$, . . . , $F_1^q$ and $F_2^q$ the numbers one to $q$ determining specific codes, time intervals between those frame pulses being equal to $(n+1)\theta$ with a tolerance $\pm\Delta\theta$ and time intervals between $F_2^o$ and $F_1^1$, $F_2^1$ and $F_1^2$, . . . , $F_2^{q-1}$ and $F_1^q$ being equal to $m\theta$ with a tolerance of $\pm\Delta\theta$, the said device also comprising;

$(n+2+m)$ stages in said shift register, a second four-input coincidence circuit connected so that, after a time $T_3$ from the occurrence of $F_1^o$, it operates to deliver a signal when pulses $F_2^o$, $F_1^1$ and $F_2^1$ simultaneously enter the $(n+2+m)$th, $(n+2)$th and 1st stages of said shift register whose outputs are connected to the three inputs of a second coincidence circuit, then when pulses including $F_2^1$, $F_1^2$ and $F_2^2$, and on up to $F_2^{q-1}$, $F_1^q$, and $F_2^q$, $T_3$, as determined by a timing circuit connected to the fourth input of the said second coincidence circuit, said last mentioned timing circuit delivering a signal longer than $(n+1+m)\theta+2\Delta\theta$, and said T, being defined as substantially longer than $[(n+1)(q+1)+mq]\theta + (2q+1)\Delta\theta$;

a counter, having a capacity $(q+1)$, connected to be reset by the occurrence of each pulse $F_1^o$, which counts the number of signals from one to $q$ delivered from the second coincidence circuit;

and means for synchronizing said clock, at rate $\theta$, on each of the pulses $F_2^o$, $F_1^1$, $F_2^1$, $F_1^2$, . . . , $F_2^{q-1}$, $F_1^q$.

4. A decoder device according to claim 3, wherein the means for synchronizing the clock, at rate $\theta$, are characterized by the fact that they comprise:

a reoperable timing circuit, having a time constant $\theta$, which is triggered under the control of the timing circuit having the time constant $2\Delta\theta$;

a set of logic gates connected from said first coincidence circuit output and the outputs of the 1st and $(n+2+m)$the stages of said shift reigster so as to produce a signal when pulses $F_2^o$, $F_1^1$, $F_2^1$, . . . , or $F_1^q$ enter the shift register, the said signal being applied to one of the two inputs of a third coincidence circuit whose other input is connected from output of the reoperable timing circuit having a time constant $\theta$;

a second timing circuit, having a time constant $\Delta\theta$, which is triggered when the third coincidence circuit is on and having an output connected to said divider-by-$k$ enable input so as to prevent said divider-by-$k$ from operating from a duration $\Delta\theta$ following the time $\theta$ defined by the beginning of one of the pulses $F_2^o$, $F_1^1$, . . . $F_1^q$, entering the shift register.

5. A decoder device according to claim 4, characterized by the fact that:

the timing circuit, having a time constant $\theta$, is constituted by a reoperable monostable circuit having a free-running duration $\theta$;

at least one of the other timing circuits, having a time constant $t_o$, is constituted by monostable circuits having time constant $t_o$, said circuits switched as soon as a pulse leading edge is applied to their input and are reset after a time period $t_o$.

6. A decoder device according to claim 4, for processing secondary radar transponder replies comprising normal codes, including code X, made of n conditions 0 or 1 bracketed by pulses $F_1^o$ and $F_2^o$, position identification specific codes formed from a normal code followed by its repetition $q=1$ spaced by a standard time interval $m\theta$, and of specific mayday codes formed from a normal code followed by q codes of $n$ conditions bracketed by pulse pairs $F_1^1$ and $F_2^1$, $F_1^2$ and $F_2^2$, $F_1^3$ and $F_2^3$, said pulse pairs being time spaced by a standard time interval of $m\theta$, the said decoder device comprising:

means connecting the outputs of the counter of capacity $(q+1=4)$, where numbers $q=1$ and $q=3$ are indicated, connecting to two independent integrator circuits, which independently decode position identification specific code and mayday specific code, the time constant of the said integrator circuit being long enough so that they are not sensitive to numerous successive markings of duration close to the reply repetition period $t_r$.

7. A decoder device according to the claim 6, capable of processing specific position identification codes, called "SPI codes" constituted by a normal code followed, at a standard interval $m\theta$, by a pulse called an SPI pulse, comprising:

a flip-flop whose enable input is connected from the set of logic gates having its erasing input connected from the output of the second coincidence circuit so as to turn its condition when said SPI pulse enters the shift register, and means responsive to said second coincidence circuit to deliver a signal before the end of time $T_1$, thereby to reset said flip-flop;

an integrator, connected from the said flip-flop output, to decode said SPI codes, the said integrator time constant being so long that it is not sensitive to short duration condition changes of flip-flop output, but short enough to be sensitive to numerous successive changes of duration close to the reply repetition period $t_r$.

8. A decoder device according to claim 3, including means which allow the encoded word to be processed only if its pulse $F_1^o$ is applied to the overall device input between times $\tau_1$ and $\tau_2$ following reference signal transmission, the said means comprising:

a timing circuit having a time constant $\tau_1$, which is triggered by the reference signal, and a time circuit having a time constant $(\tau_2 - \tau_1)$, which is triggered at the end of time $\tau_1$, said circuits being cascade connected;

and means connecting the output of said timing circuit having time constant $(\tau_2 - \tau_1)$ to a specific enable input triggering said first timing circuit having timing constant $\Delta\theta$.

9. A decoder device according to claim 8, wherein said first timing circuit has a time constant $\Delta\theta$ and is provided with a specific triggering enable input comprising:

a flip-flop provided with a data input connected from the output of said timing circuit having a time constant $(\tau_2 - \tau_1)$ and a pulse input connected from the output of said timing circuit having time constant $2\Delta\theta$;

and a delay circuit, having a delay constant $\Delta\theta$, comprising a serially connected resistor and capacitor, said capacitor having one of its electrodes connected to ground and the other connected to the input of the timing circuit having said time constant $T_1$.

* * * * *